US012781628B2

(12) United States Patent
Mahavadi et al.

(10) Patent No.: US 12,781,628 B2
(45) Date of Patent: Nov. 3, 2026

(54) REAL-TIME ANALYSIS OF PRODUCTION CHEMICALS AT WELLSITES

(71) Applicant: Schlumberger Technology Corporation, Sugar Land, TX (US)

(72) Inventors: Sharath Chandra Mahavadi, Cambridge, MA (US); Ling Feng, Cambridge, MA (US); Olga Barduk, Tananger (NO); Rune Evjenth, Sandsli (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 155 days.

(21) Appl. No.: 18/833,463

(22) PCT Filed: Mar. 24, 2023

(86) PCT No.: PCT/US2023/016187
§ 371 (c)(1),
(2) Date: Jul. 26, 2024

(87) PCT Pub. No.: WO2023/183546
PCT Pub. Date: Sep. 28, 2023

(65) Prior Publication Data

US 2025/0146411 A1 May 8, 2025

Related U.S. Application Data

(60) Provisional application No. 63/269,883, filed on Mar. 24, 2022.

(51) Int. Cl.

| | |
|---|---|
| ***E21B 49/08*** | (2006.01) |
| ***E21B 41/02*** | (2006.01) |
| ***G01N 27/447*** | (2006.01) |

(52) U.S. Cl.
CPC ........ *E21B 49/0875* (2020.05); *E21B 49/088* (2013.01); *G01N 27/44743* (2013.01); *E21B 41/02* (2013.01)

(58) Field of Classification Search
CPC .......... E21B 37/06; E21B 41/02; E21B 49/08; E21B 49/0875; E21B 49/088;
(Continued)

(56) References Cited

U.S. PATENT DOCUMENTS

| | | | |
|---|---|---|---|
| 8,881,577 | B1 | 11/2014 | Agar et al. |
| 9,976,417 | B2 | 5/2018 | Mahavadi et al. |

(Continued)

FOREIGN PATENT DOCUMENTS

| | | | |
|---|---|---|---|
| WO | 2011064632 | A2 | 6/2011 |
| WO | 2015023917 | A1 | 2/2015 |

(Continued)

OTHER PUBLICATIONS

Laurent Geiser et. al., Non-aqueous capillary electrophoresis 2005-2008, Electrophoresis, vol. 30, No. 1, pp. 36-49, Jan. 2009.

(Continued)

*Primary Examiner* — Gurpreet Kaur
(74) *Attorney, Agent, or Firm* — Jeffrey D. Frantz

(57) ABSTRACT

Systems and methods presented herein relate to real-time analysis of production chemicals at wellsites utilizing capillary electrophoresis (CE) analysis of produced water in-situ and in substantially real-time to determine the effectiveness and efficiency of production chemicals injected into wells. For example. systems and methods presented herein include CE equipment configured to receive sample fluids from production fluids extracted from various locations of wellsites, and to perform CE analysis to generate data relating to one or more fluid properties of the sample fluids. The systems and methods presented herein also include an
(Continued)

analysis and control system configured to detect and quantify individual components of production chemicals injected into wells of the wellsites based at least in part on the data relating to the one or more fluid properties of the sample fluids.

20 Claims, 11 Drawing Sheets

(58) Field of Classification Search
CPC ........ G01N 27/44743; G01N 27/44756; F24H 3/0429; F24H 3/0435; F24H 3/0441; F24H 3/0447; F24H 3/0452; H05B 1/0236

See application file for complete search history.

(56) References Cited

U.S. PATENT DOCUMENTS

| | | | | |
|---|---|---|---|---|
| 10,018,590 | B2 | 7/2018 | Mahavadi et al. | |
| 2015/0114837 | A1 | 4/2015 | Mahavadi et al. | |
| 2015/0268374 | A1 | 9/2015 | Rapoport | |
| 2017/0045476 | A1 * | 2/2017 | Mahavadi | G01N 27/44791 |
| 2019/0120791 | A1 | 4/2019 | Al-Gouhi et al. | |

FOREIGN PATENT DOCUMENTS

| | | | |
|---|---|---|---|
| WO | 2018081506 | A1 | 5/2018 |
| WO | 2018183555 | A1 | 10/2018 |

OTHER PUBLICATIONS

Search Report and Written Opinion of International Application No. PCT/US2023/016187 dated Jul. 18, 2023, 10 pages.

* cited by examiner

70

| Time (Min) | Event | Value | Duration | Inlet vial | Outlet vial | Summary | | |
|---|---|---|---|---|---|---|---|---|
| | Rinse - Pressure | 20.0 psi | 0.50 min | BI:B1 | BO:B | Forward | Rinse With Anion Coating | 72 |
| | Rinse - Pressure | 20.0 psi | 0.50 min | BI:C1 | BO:B | Forward | Rinse With Anion Separation Buffer | 74 |
| | Inject - Pressure | 0.5 psi | 8.0 sec | BI:A3 | BO:A | Override, Forward | Sample Injection | 76 |
| | Inject - Pressure | 0.1 psi | 10.0 sec | BI:A1 | BO:A | No Override, Forward | Water Injection | |
| 0.00 | Separate - Voltage | 20.0 KV | 8.00 min | BI:D1 | BO:D | 1.00 Min ramp, Reverse Polarity | Separation | 78 |
| 1.25 | Autozero | | | | | | | 80 |
| 8.00 | Stop Data | | | | | | | |
| 8.10 | Rinse - Pressure | 20.0 psi | 0.50 min | BI:E1 | BO:B | Forward | Rinse With Conditioner - Na | 82 |
| 8.60 | Rinse - Pressure | 20.0 psi | 0.50 min | BI:F1 | BO:B | Forward | Rinse With Rinse Solution | |
| 9.10 | End | | | | | | | |
| | | | | | | | | |

FIG. 5

REAL-TIME ANALYSIS OF PRODUCTION CHEMICALS AT WELLSITES

CROSS-REFERENCE TO RELATED APPLICATION

This application claims priority to and the benefit of U.S. Provisional Application No. 63/269,883, entitled "REAL-TIME ANALYSIS OF PRODUCTION CHEMICALS AT WELLSITES", filed Mar. 24, 2022, which is herein incorporated by reference in its entirety for all purposes.

BACKGROUND

The present disclosure generally relates to real-time analysis of production chemicals at wellsites. More specifically, the present disclosure relates to systems and methods utilizing capillary electrophoresis analysis of produced water in-situ and in substantially real-time to determine the concentration, effectiveness, and efficiency of production chemicals injected into wells and comingled flows.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Crude oil production is a relatively complex process that often demands strategies tailored to a particular reservoir and, more often, to a particular field. A majority of the decisions on a production strategy depends on the type of formation, maturity of the field, crude oil chemistry, and so forth. Often, there is good understanding of the formation type, but proper understanding of crude oil and reservoir water chemistry is often quite challenging due to the relative complexity associated with these parameters. In addition, issues have been observed in evaluating the efficiency of production chemicals that are used to enhance the oil recovery and to improve flow assurance by preventing or delaying scale and corrosion issues. The water that is present in the reservoir and co-produced with crude oil poses significant production challenges and environmental concerns.

A range of chemical additives is used to ensure seamless production of oil and gas from underground reservoirs. The need for chemical treatment generally varies according to the size, type of production process, nature of the fluids, and the age of the field. For example, a relatively small onshore field with a shallow reservoir may produce oil with only the addition of an emulsion breaker (e.g., demulsifier) and corrosion inhibitor on a continuous basis. Conversely, a relatively large offshore installation with satellite fields and sub-sea wellheads and regular water injection may need many types of production chemicals to maintain uninterrupted production.

A broad classification of production chemicals may be designed according to their functional use. First, production chemicals are process aids that are applied to improve and maximize the efficiency of the infrastructure (e.g., the downhole completion, pipeline, the process, and separation plant and export lines). These process aids include chemicals that specifically promote the clean separation of oil, gas, and water phases. Second, chemicals may be added to prevent undesirable fouling in the plant.

When considering the production chemistry needs of an oil and gas production system, it is possible to analyze the problem from two different perspectives, both of which may provide valuable insights into how various issues should be addressed. The first perspective is to address the chemical needs in relation to the specific portion of the process. This is important because it highlights the inter-relationship of particular production chemistry issues, and emphasizes the need to develop solutions for the entire system. The second perspective is to classify chemicals in relation to their function in the process system (e.g., corrosion control, scale control, demulsification, microbiological control, wax and asphaltene control, foam control, hydrate control, hydrogen sulphide and other sulphur compounds, and so forth).

In the production process, efficient use of production chemicals yields multiple benefits. For example, the infrastructure may be maintained in better working order, and equipment issues may be kept to a minimum. In addition, prevention of corrosion may avoid costly replacement of steel structures, prevent leaks of gases and discharges of oil, and so forth. Furthermore, the production of valuable hydrocarbons may be maximized by ensuring efficient separation of phases and by minimizing fouling deposits. Moreover, environmental acceptability may be gained by ensuring that water discharges are as clean as possible and that toxins are removed from all phases.

In summary, the use of production chemicals improves the health and safety of workers, improves the efficiency of operation, reduces costs, and enables environmental compliance. When the use of chemical additives is under consideration for any processes, it is important to fully analyze both the benefits that may be delivered and the risks that are involved. For any chemical, a thorough risk assessment should be carried out in relation to the handling and health, safety and environmental (HSE) issues that are involved.

In each application area, the efficiency and suitability of individual chemicals may vary. The production performance against specific criteria is important, but the top-performing chemical may not always be the most suited to each system. For example, issues relating to the compatibility of the chemical with materials, fluids, and with other production chemicals should be taken into account together with thermal stability and viscosity. Finally, all chemical additives that are supplied must conform to local environmental regulations and practices on HSE issues.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a system that includes capillary electrophoresis (CE) equipment configured to receive one or more sample fluids from one or more production fluids extracted from one or more locations of one or more wellsites, and to perform CE analysis to generate data relating to one or more fluid properties of the one or more sample fluids. The system also includes an analysis and control system configured to detect and quantify one or more individual components of production chemicals injected into one or more wells of the one or more wellsites based at least in part on the data relating to the one or more fluid properties of the one or more sample fluids.

In addition, certain embodiments of the present disclosure include a method that includes receiving, via capillary electrophoresis (CE) equipment, one or more sample fluids from one or more production fluids extracted from one or more locations of one or more wellsites. The method also includes performing, via the CE equipment, CE analysis to generate data relating to one or more fluid properties of the one or more sample fluids. The method further includes detecting and quantifying, via an analysis and control system, one or more individual components of production chemicals injected into one or more wells of the one or more wellsites based at least in part on the data relating to the one or more fluid properties of the one or more sample fluids.

In addition, certain embodiments of the present disclosure include an analysis and control system that includes one or more processors configured to execute instructions stored on memory media of the analysis and control system. The instructions, when executed by the one or more processors, cause the analysis and control system to detect and quantify one or more individual components of production chemicals injected into one or more wells of one or more wellsites based at least in part on capillary electrophoresis (CE) data detected for one or more sample fluids by CE equipment communicatively coupled to the analysis and control system. The one or more sample fluids are from one or more production fluids extracted from one or more locations of the one or more wellsites.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which:

FIG. 5 is a table illustrating an example set of steps of a method of analysis of negatively charged or anionic parts of sample fluids, in accordance with embodiments of the present disclosure;

DETAILED DESCRIPTION

Figure 1:
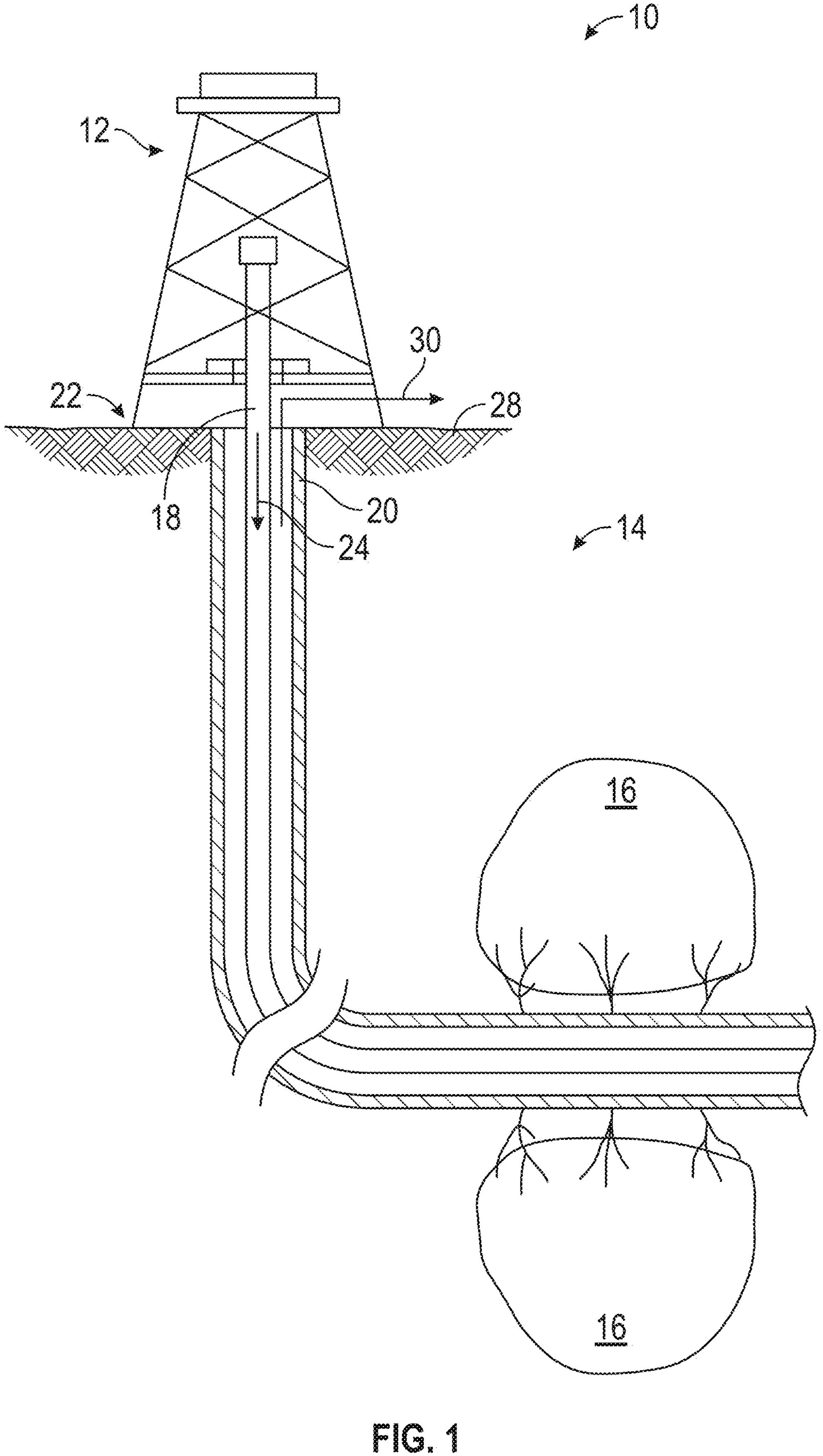
FIG. 1 illustrates a wellsite having a drilling rig positioned above a subterranean formation that includes one or more oil and/or gas reservoirs, in accordance with embodiments of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "uphole" and "downhole", "upper" and "lower," "top" and "bottom," and other like terms indicating relative positions to a given point or element are utilized to more clearly describe some elements. Commonly, these terms relate to a reference point as the surface from which drilling operations are initiated as being the top (e.g., uphole or upper) point and the total depth along the drilling axis being the lowest (e.g., downhole or lower) point, whether the well (e.g., wellbore, borehole) is vertical, horizontal or slanted relative to the surface.

In addition, as used herein, the terms "real time", "real-time", or "substantially real time" may be used interchangeably and are intended to described operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, in the context of the embodiments described herein, data relating to analysis of the sample fluids may be collected approximately every 30 minutes, every 20 minutes, every 15 minutes, every 10 minutes, every 5 minutes, every 2 minutes, every minute, or even more frequent, depending on the particular fluid being sampled and the particular parameters of the equipment being used to sample the fluids. In addition, as used herein, the terms "automatic" and "automated" are intended to describe operations that are performed or are caused to be performed, for example, by an analysis/control system (i.e., solely by the analysis/control system, without human intervention).

Environmental authorities often require routine monitoring of the performance of a field process system, including a produced water system, to be carried out by field personnel. The specific requirements of this testing may depend upon whether the produced water is intended for disposal or injection. For example, if intended for disposal, regular testing of the oil in water content may be performed as a minimum. This may typically be measured daily, although local regulatory authorities may specify the testing frequency and the test methods employed. In contrast, the quality of produced water intended for re-injection is likely to have a higher specification and, consequently, may demand increased monitoring and management.

Apart from residual amounts of oil in the produced water, there are also added production chemicals that should be tracked and reported to authorities. Currently the amounts of production chemicals in produced water are either assumed or modelled or measured in case-specific setups. However, there is currently no reliable analysis method available, which could measure concentrations of various production chemicals in the produced water (e.g., either on site or in the laboratory) considering the complexity involved in the chemistry of individual production chemicals and the final design.

In addition to the environmental perspective, for most production chemicals to achieve maximum efficiency, they should be injected at a minimum concentration. Failure to achieve optimal treatment concentration could result in inorganic deposits, reduced water quality, or enhanced corrosion.

One of the most important parameters influencing the efficiency of an inhibitor is the concentration and types of constituents present in the system. Considering the wide range of chemistries available, it is relatively difficult to utilize one single method or instrument to analyze all or some of the constituents in a production chemistry. Though there is only limited literature available on the analysis of inhibitors, studies generally show that it is difficult to analyze its composition by methods such as high pressure liquid chromatography (HPLC), inductively coupled plasma (ICP), infrared or Raman techniques, or differential scanning calorimetry (DSC). In addition, many conventional analysis methods require relatively tedious sample preparation. No easy method exists for on-site quality control of various inhibitors, and this generally leads to compromising the efficiency of the process system. Hence, there is a need for a relatively simple method that can be used to quantify the product concentrations on-site.

In addition, with increasing scrutiny and traceability required on product design, it is an even more important business requirement to verify the presence of trace amounts of chemicals in the discharge streams during production. In general, operators often use excessive inhibitors to avoid system failure, and the excess inhibitors end up in the discharge stream. Having an analytical method onsite, which can measure the product quantities in relatively complex brines at the injection and discharge points, may benefit operators financially as well as helping easily maintain compliance with environmental regulations.

The embodiments described herein provide a methodology to analyze in-situ and in substantially real-time the composition of inhibitors (as well as other production chemicals) while being pumped into the production systems, and also at different points in the field including the discharge locations. The embodiments described herein are based on capillary electrophoresis (CE) and do not require the addition of tracers inside the production chemicals. Based on the significance of each inhibitor (or other production chemicals) on maintaining the integrity of the production systems, it may be utilized to determine the concentration of all or a limited number (including only one) of the inhibitors present in the discharge water. This methodology is also applicable to determine the composition of water and other aqueous and organic base fluids used to prepare the final product.

In addition, this methodology may be used for quality assurance/quality control (QA/QC) analysis of the composition of each batch of inhibitors (e.g., solid ones should be dissolved prior to its analysis). Main advantages are the relatively high accuracy, ease-of-use, and relatively low cost. Variations from batch-to-batch, but also evolution after storage and transportation, may be identified, thereby improving the overall QA/QC of the manufacturing and of the operations.

The overall management of the field process system, including the produced water system, may involve a regular review of current performance data measured against historical trends. For each system, the potential to add value to overall field performance through improvements in the management of the process system should be investigated. When considering such issues, it is necessary to have an overview of the whole field operation as well as just the particular system.

In general, the embodiments described herein address two key questions that are relatively important for the overall review of field performance: (1) an analytical system that helps determine ways to improve system efficiency and make decisions to reduce residual amounts of oil and added production chemicals in the produced water, and (2) an analytical system that improves the performance of other parts of the system, both upstream and downstream.

It is generally the case that most oil and gas wells produce water (e.g., formation water, and returned production chemicals) along with hydrocarbons at some time during their productive life. Both the produced water and the returned injected production chemicals or "flowback" (e.g., usually 15-50% of the initial volume returns, typically, gradually amalgamating with formation water) are deemed oilfield wastes and are, therefore, subject to regulatory constraints on handling and disposal. For example, FIG. 1 illustrates a wellsite 10 having a drilling rig 12 positioned above a subterranean hydrocarbon-producing formation 14 that includes one or more hydrocarbon reservoirs 16. During operation of the illustrated well, a derrick and a hoisting apparatus of the drilling rig 12 may raise and lower a drilling string 18 into and out of a wellbore 20 of a well 22 to drill the wellbore 20 into the subterranean hydrocarbon-producing formation 14, as well as to position downhole well tools within the wellbore 20 to facilitate completion and production operations of the well. The drilling rig 12 is also used to place steel casing strings that line the wellbore 20, and also to facilitate cementing and perforating operations. For example, subsequent to drilling and casing operations, in certain circumstances, production chemicals may be introduced into the well 22 through the casing, as illustrated by arrow 24, which may be used to facilitate production of oil and/or gas resources from the well. As described in greater detail herein, the produced water and the returned injected production chemicals 24 may be returned to the surface 28 of the wellsite 10 (e.g., through the casing of the wellbore 20), as illustrated by arrow 30. Subsequent to drilling, well construction, and hydraulic fracturing operations, both water and hydrocarbons are produced to the surface 28 through production tubing, pumps, and completions hardware installed in the wellbore 20.

As used herein, the term "production fluids" is intended to refer to both the production chemicals 24 that are injected into the well 22 as well as the water 30 produced from the well 22, among other fluids in the well 22 during oil and/or gas production. As such, the "production fluids" may include multiple individual components (e.g., the production chemicals 24, the produced water 30, and so forth). In addition, as used herein, the term "sample fluids" is intended to refer to fluids that are sampled (e.g., extracted) from any of the production fluids at any point (see, e.g., P1-P4 in FIG. 3) of the system.

Figure 2:
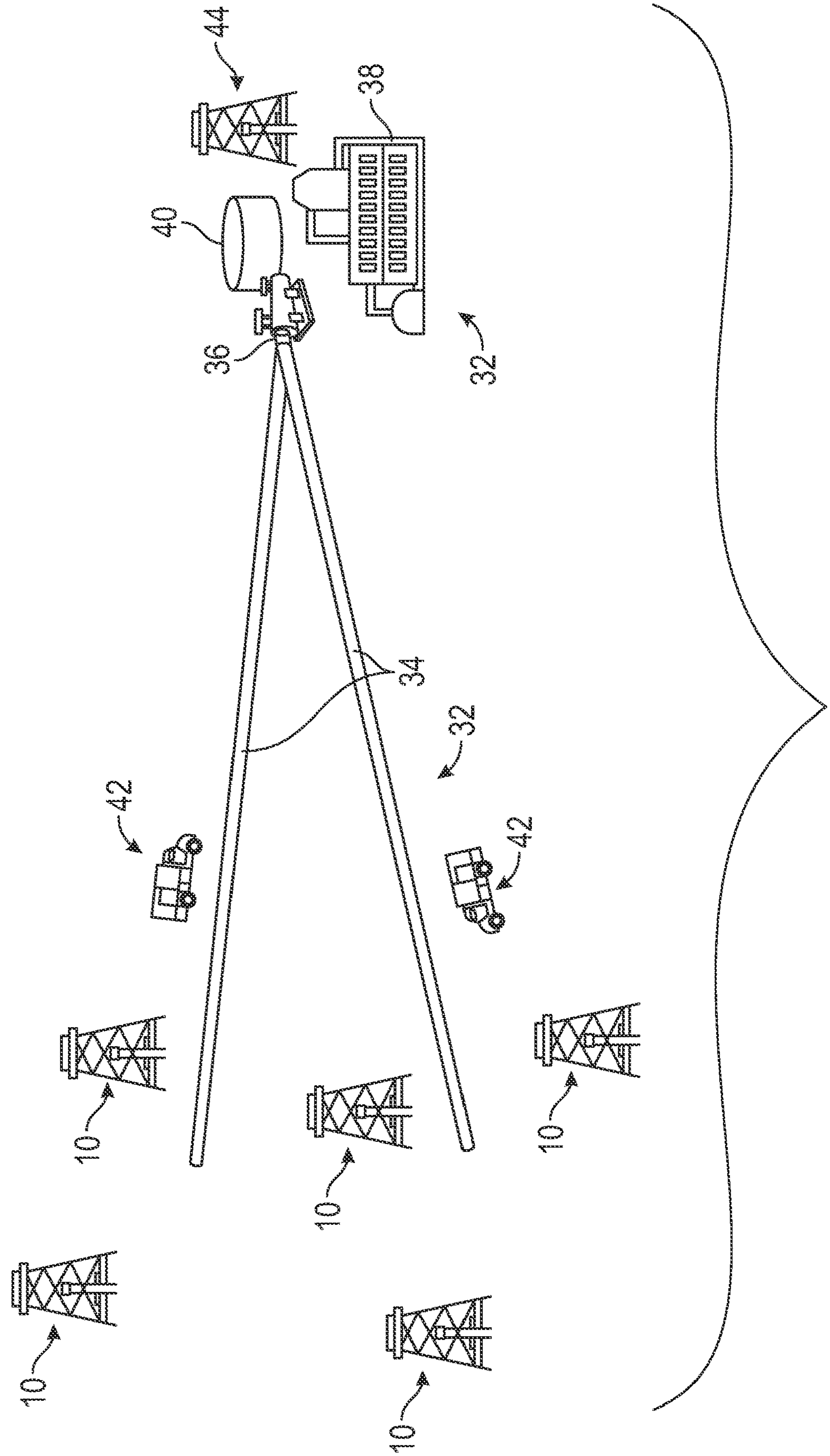
FIG. 2 illustrates a water handling and disposal (WHD) system whereby produced water from a plurality of wellsites are disposed and handled by the WHD system, in accordance with embodiments of the present disclosure.

In certain situations, operators often contract for disposal and handling of the produced water with a midstream specialist firm focused on water handling and disposal (WHD). For example, FIG. 2 illustrates a WHD system 32 whereby produced water from a plurality of wellsites 10 is disposed and handled by the WHD system 32. As illustrated, in certain embodiments, handling of the produced water may be done via a relatively capital expenditure-intensive and usually proprietary network of pipelines 34, pumping stations 36, treatment facilities 38, storage tanks 40, trucks 42, and so forth. The WHD firm's existing physical infrastructure network exists to accept, convey, treat, and disperse/dispose of produced water. Disposal of produced water is often via reinjection into a salt-water disposal (SWD) well 44, often after treatment to remove potentially harmful scaling ions and/or solids as the SWD owner dictates (e.g., to preserve injectivity to maintain the SWD well 44).

As described in greater detail herein, produced water (including the returned injected production chemicals) 30 from a plurality of wellsites 10 may be analyzed in-situ and in substantially real-time utilizing CE to determine the effectiveness and efficiency of production chemicals 24 injected into wells of the plurality of wellsites 10. In particular, by analyzing the produced water (including the returned injected production chemicals) 30 among a plurality of wellsites 10, the effectiveness and efficiency of production chemicals 24 injected into wells in an entire field may be determined.

Although inhibitor composition may be analyzed in a laboratory with advanced analytical tools, there are several major issues with current conventional practices in the industry including, but not limited to: (1) the complexity of the chemistries (e.g., aliphatic, aromatic, polymers, inorganic salts, and so forth) of different production chemicals 24 warrants the use of multiple techniques to perform complete and sensitive analysis of the final mixture; (2) the composition of inhibitors and their nature (e.g., pH, and so forth) change significantly from field to field and for each particular job; (3) the individual components of the production chemicals 24 may interact with each other, leading to inaccurate concentrations of each component in the final product (e.g., separation of each component might be required in a first step); (4) the accuracy of the various analytical tools may be different, and the final analysis may lead to quality issues; (5) perhaps most importantly, none of these analytical techniques may be deployed to field locations; and (6) experts are required to analyze and interpret the data obtained from advanced high-end analytical tools.

Certain conventional techniques often quantify the concentration of at least one additive in settable cement slurry composition based on the addition of a tracer in the raw additives. The tracer concentration in the mixed fluids are often analyzed by electrochemistry. With the tracer content in the raw additive being known, the concentration of the additive in the mixed fluids may be determined. Such techniques provide relatively accurate results, but require the addition of a tracer in the raw additive. Furthermore, it is generally necessary to add different tracers in each additive, the concentrations for which need to be determined in the mixed fluids. Accuracy of measurement due to interactions between tracers and other additives present in the mix water might occur, leading to relatively inaccurate measurement results.

As described in greater detail herein, CE may be used to analyze various types of biological and pharmaceutical compounds (e.g., aromatic, aliphatic, polymeric, and so forth) with relative ease. However, as described above, no simple measurements or techniques are currently available to analyze different chemistries of production chemicals 24 in an oil field. CE is highly sensitive and easy to operate. For example, the analysis units may be miniaturized to accommodate in a wellsite laboratory or may be purchased commercially to perform routine laboratory analysis at onsite laboratories or commercial analytical laboratories. However, the embodiments described herein utilize CE-based methods for the compositional analysis of the products prepared for oilfield applications (i.e., to determine the concentration of one or several selected inhibitors present in the produced water 30). As described in greater detail herein, the analysis may provide real-time QA/QC on the rig. In certain embodiments, the analysis may also be used to adjust the concentrations of each component to align with the formulation designed in the laboratory.

The embodiments described herein include sampling the production chemicals 24 and the produced water 30 in various locations of the field, and analyzing the individual inhibitor components' concentrations through specialized methods developed using CE. The embodiments described herein also include sampling the production chemicals 24 prior to their application to confirm their quality and performance prior to applying them either in an off-site or on-site laboratory or wellsite locations.

In contrast to current conventional techniques, CE is highly sensitive and relatively easy to operate. For example, as described above CE analysis units may be miniaturized to accommodate use in a well site laboratory and/or may be purchased commercially to perform routine laboratory analysis at onsite laboratories or commercial analytical laboratories. CE, in addition to eliminating all of the drawbacks of current conventional techniques, provides major advantages that include, but are not, limited to: (1) enabling analysis of various different types of inhibitors and other production chemicals 24 using a single analysis technique; (2) enabling analysis of various different types of ions and other production chemicals 24 using a single analysis technique; (3) the use of specific components to monitor concentrations; (4) minimum to no sample preparation as the samples may be directly extracted for analysis; (5) relative ease of operation; and (6) the proposed technology can be deployed in the field to perform the analysis onsite in substantially real-time during operation.

In addition to the production chemicals 24, CE may also be used to identify other contaminants or organic constituents in produced water 30, which may include, but are not limited to: drilling fluids, spacers, settable compositions (including cement and resins and mud), completion fluids, acidification fluids, fracturing fluids, sand control fluids, or any other fluids that may be pumped in subterranean zones. These fluids may act as anti-foamers, defoamers, dispersants, accelerators, retarders, fluid loss additives, gas migration additives, corrosion inhibitors, scale inhibitors, acids, gelling agents, crosslinkers, breakers, surfactants, ions, and so forth.

Figure 3:
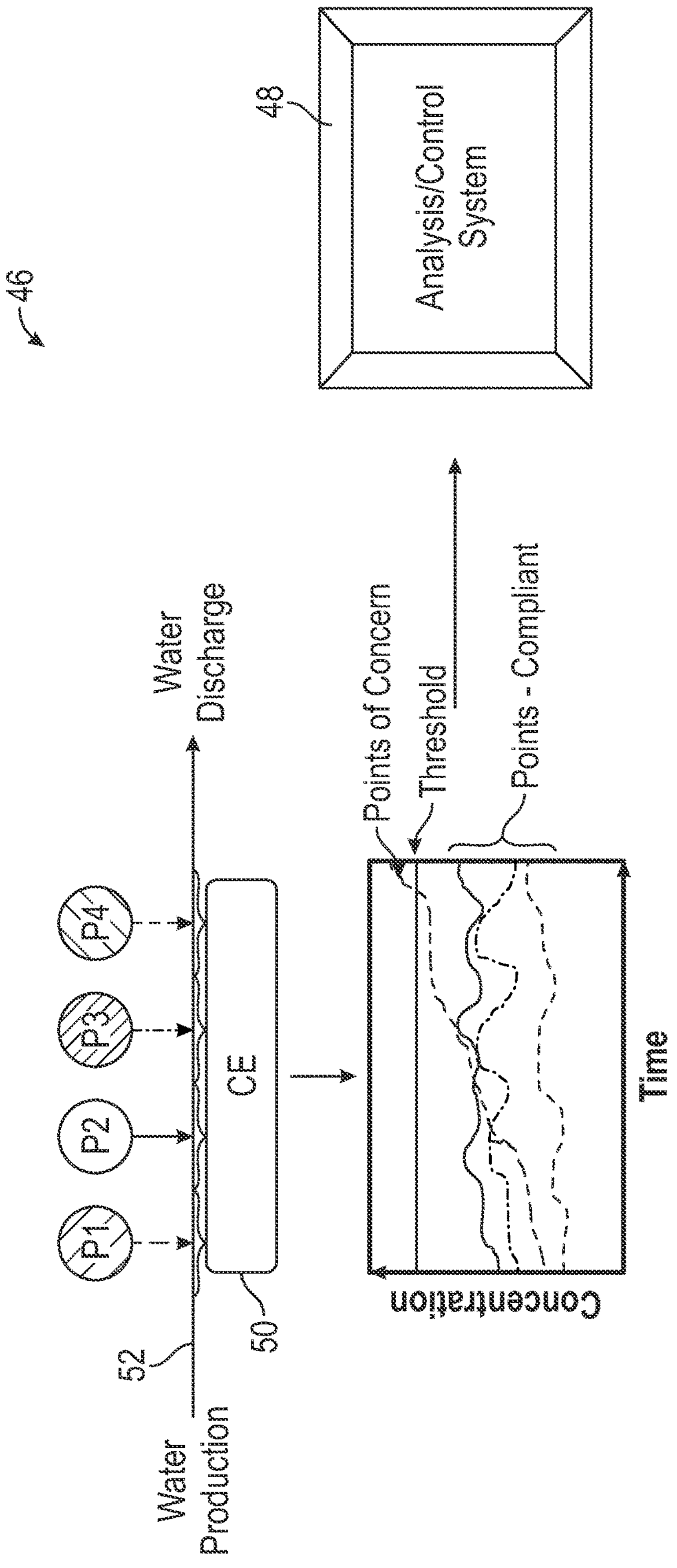
FIG. 3 is a schematic workflow of a platform monitoring system, in accordance with embodiments of the present disclosure.

The embodiments described herein enable the analysis of various aqueous fluid flows in substantially real time during operation of the wellsite 10 using CE via a platform monitoring system. For example, produced water, discharge water, product quality, or any other analysis of the aqueous fluids at the wellsite 10 may be analyzed using CE. FIG. 3 is a schematic workflow of such a platform monitoring system 46. As illustrated, fluid samples may be extracted at different points (e.g., P1, P2, P3, P4, or Pn) in a field that, for example, includes a plurality of wellsites 10 and analyzed by an analysis and control system 48 using data collected by CE equipment 50, as described in greater detail herein. In certain embodiments, the extraction of the fluid samples may be performed manually by field operators into sample vials. However, in other embodiments, the fluid samples may be extracted automatically by, for example, sample vial extraction systems that are connected to fluid flow lines 52 at the various wellsites 10. In certain embodiments, data collected by the CE equipment 50 may be automatically analyzed by the analysis and control system 48 either on-site at the respective wellsites 10 where the fluid samples are collected or off-site, for example, at a laboratory. In certain embodiments, the analysis and control system 48 may be configured to present the results of the analysis to operators, which may either confirm accurate performance or suggest corrective measures via a user interface of the analysis and control system 48.

In addition, in certain embodiments, the analysis and control system 48 may provide an indication of whether the aqueous fluids comply with new or existing environmental regulations. For example, in certain embodiments, the analysis and control system 48 may automatically assess Environmental Impact Factor (EIF) of components that are used as part of the production chemicals 24. In certain countries, EIF is tracked by regulators, and there are currently no viable analysis methods available, which generally requires operators to estimate EIF based on what (and how much) chemicals are being injected into the production stream. Embodiments of the analysis and control system 48 described herein enable direct measurement of EIF-contributing chemicals for the purpose of complying with such EIF regulations.

In CE methods, analytes migrate through electrolyte solutions under the influence of an electric field. The analytes can be separated according to ionic mobility. In addition, they may be concentrated by means of gradients in conductivity and/or pH. The electrophoretic mobility is dependent upon the charge of the molecule, the viscosity, and the atom or molecule's radius. The rate at which the particle moves is directly proportional to the applied electric field (e.g., the greater the field strength, the faster the mobility). If two ions are the same size, the one with greater charge will move the fastest. For ions of the same charge, the smaller particle has less friction and overall faster migration rate. CE generally gives faster results and provides high resolution separation than conventional techniques.

Figure 4:
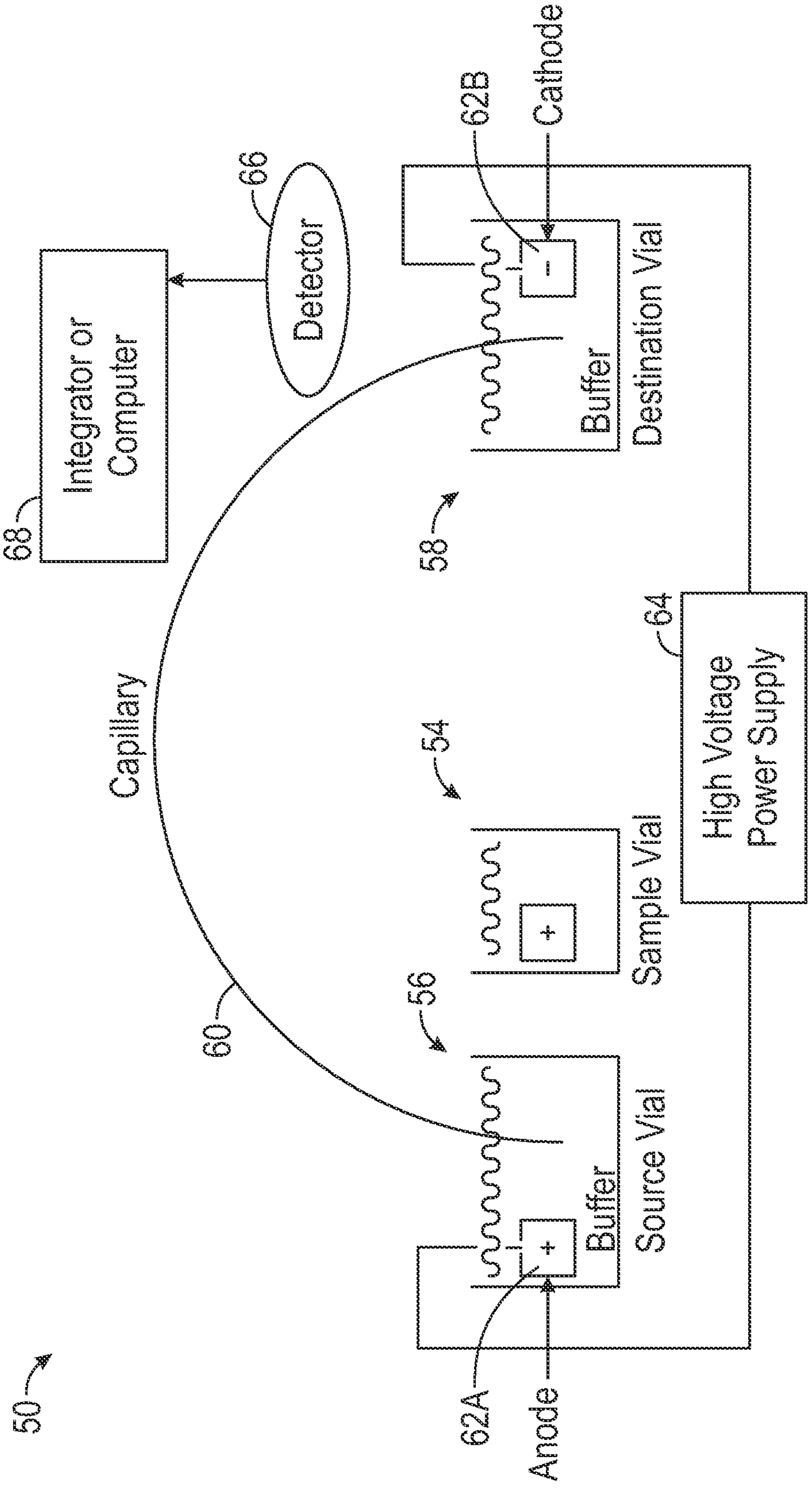
FIG. 4 illustrates a schematic diagram of capillary electrophoresis (CE) equipment of FIG. 3, in accordance with embodiments of the present disclosure.

The instrumentation used to perform CE is relatively simple. FIG. 4 illustrates a schematic diagram of the CE equipment 50 of FIG. 3. As illustrated, in certain embodiments, the CE equipment 50 may include a sample vial 54 (e.g., that includes a sample fluid extracted from a wellsite 10 of a field, as described in greater detail herein), a source vial 56, a destination vial 58, a capillary 60, electrodes 62 (e.g., an anode 62A coupled to the source vial 56 and a cathode 62B coupled to the destination vial 58), a high-voltage power supply 64, a detector 66, and an integrator or computer 68. In certain embodiments, the source vial 56, the destination vial 58, and the capillary 60 may be filled with an electrolyte such as an aqueous buffer solution. To introduce the sample fluid, the capillary inlet is placed into the sample vial 54 containing the sample fluid. Then, the sample fluid is introduced into the capillary 60 via capillary action, pressure, siphoning, or electrokinetically, after which the capillary 60 is returned to the source vial 56.

The migration of analytes is initiated by an electric field that is applied between the source and destination vials 56, 58 and is supplied to the electrodes 62 by the high-voltage power supply 64. Ions are pulled through the capillary 60 in the same direction by electroosmotic flow. The analytes separate as they migrate due to their different electrophoretic mobility, and are detected near the outlet end of the capillary 60. The output of the detector 66 is sent to the integrator or computer 68, the data relating to which may be displayed as an electropherogram, which reports detector response as a function of time. Separated chemical compounds appear as peaks with different retention times in an electropherogram, and area under the peak is proportional to concentration. The easiest way to identify a CE peak is to compare the migration time with that of a known compound by, for example, the analysis and control system 48 of FIG. 3.

The embodiments described herein facilitate the application of various production chemicals 24. For example, FIG. 5 is a table illustrating an example set of steps of a method 70 of analysis of negatively charged or anionic parts of sample fluids. As illustrated, in certain embodiments, the capillary 60 may first be coated with an anion coating (step 72) and conditioned with a separation buffer (step 74). Then, the sample fluid may be injected into the column (step 76), followed by separation by applying voltage via the high-voltage power supply 64 (step 78). After separation and detection (step 80), the capillary 60 may be rinsed with a conditioner and rinse solution (step 82). In certain embodiments, additional steps may be added or certain steps may be removed, depending on the analytes that are of interest.

Figure 6A:
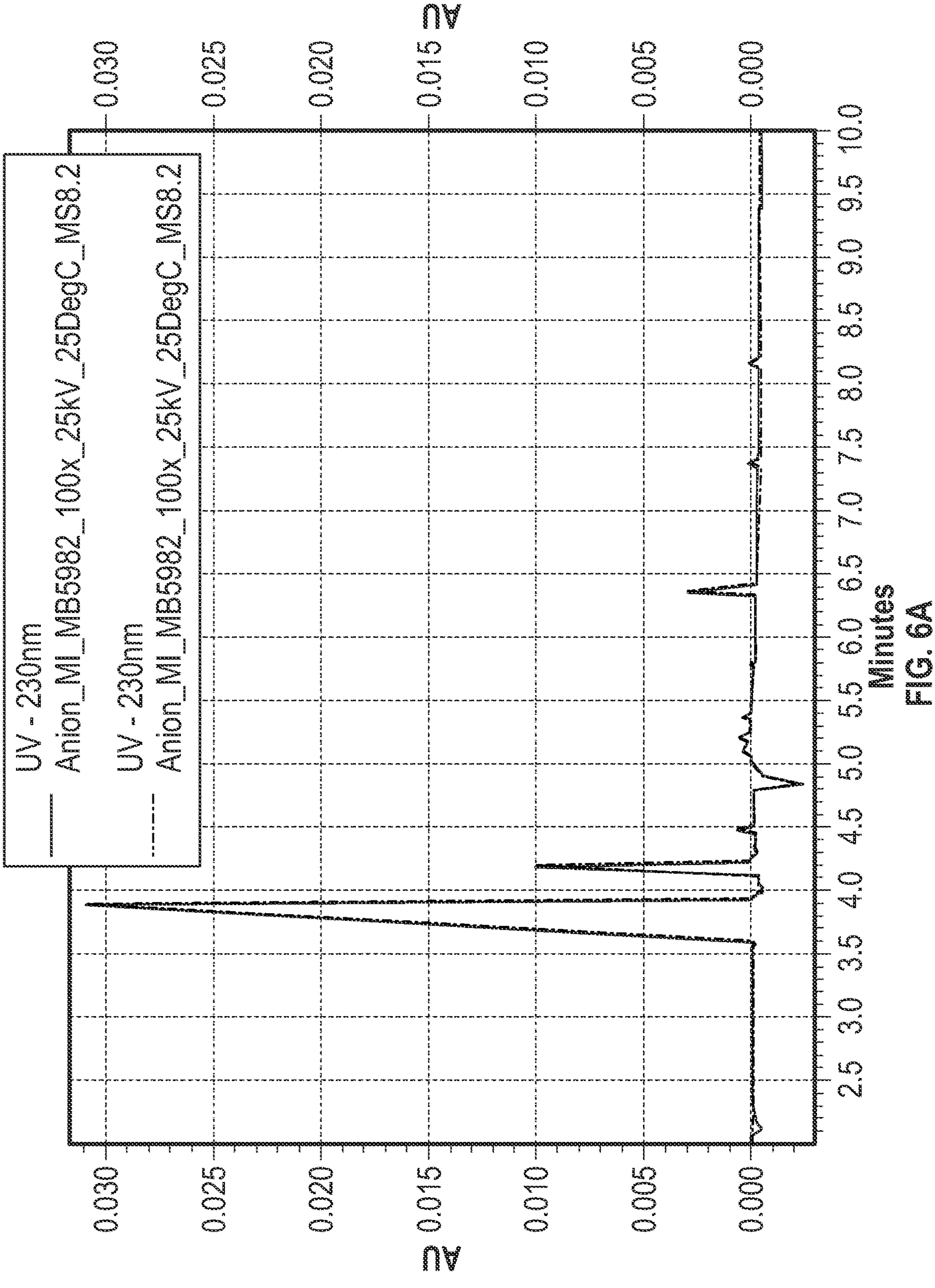
FIGS. 6A through 6D illustrate analysis results for a microbiocide, a hydrogen sulfide ($H_2S$) scavenger, a scale inhibitor, and a corrosion inhibitor, in accordance with embodiments of the present disclosure.
Figure 6B:
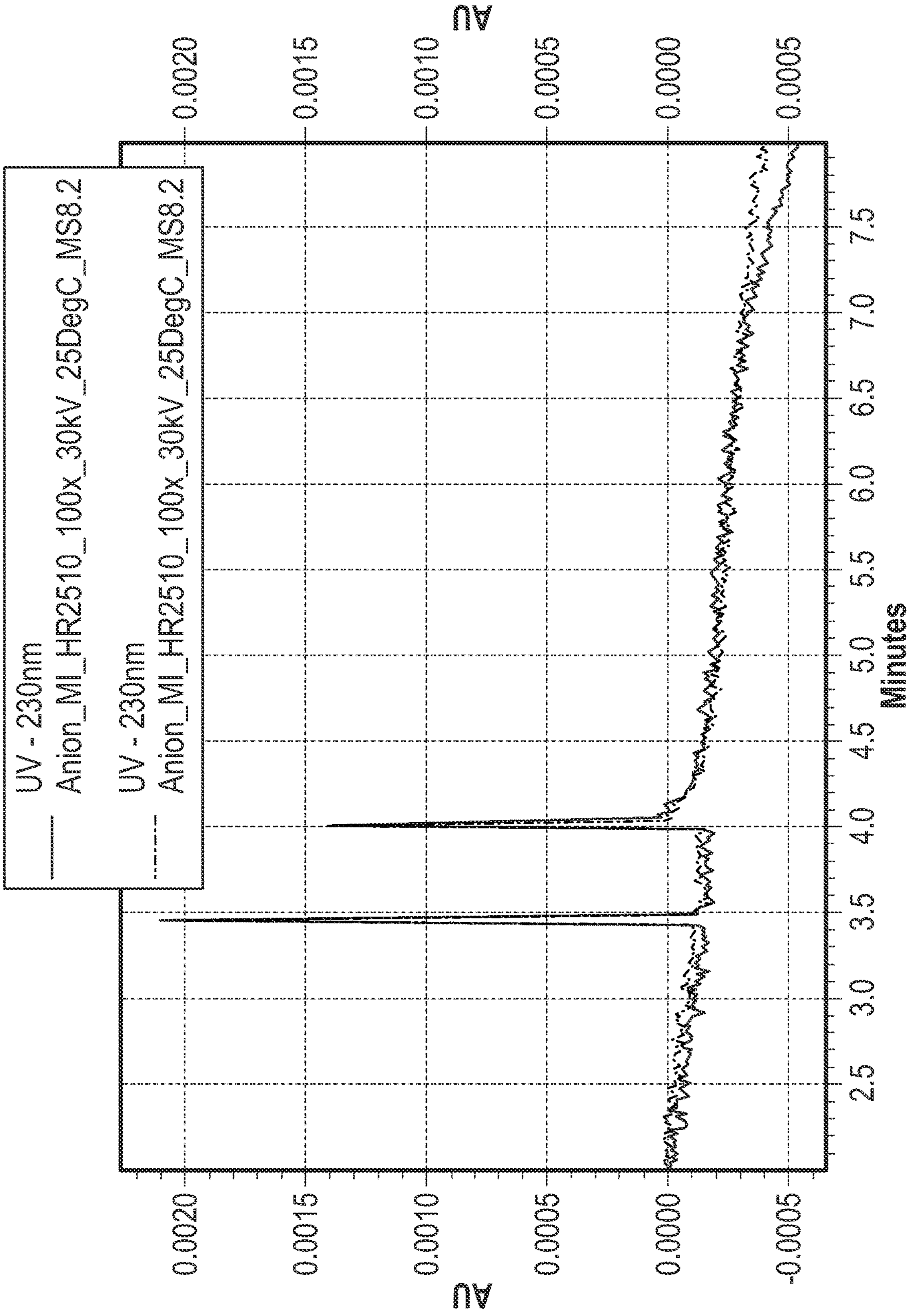
Figure 6C:
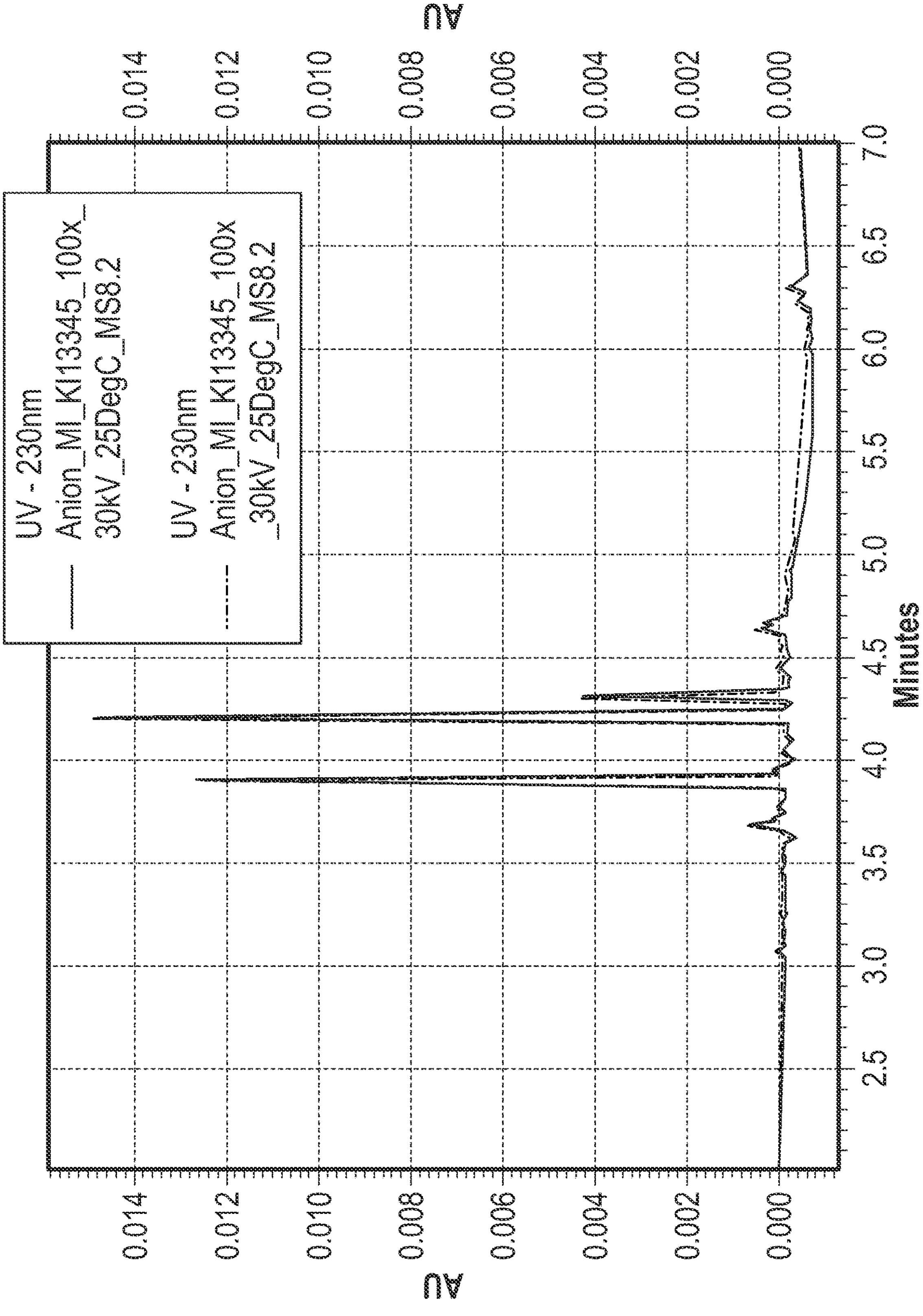
Figure 6D:
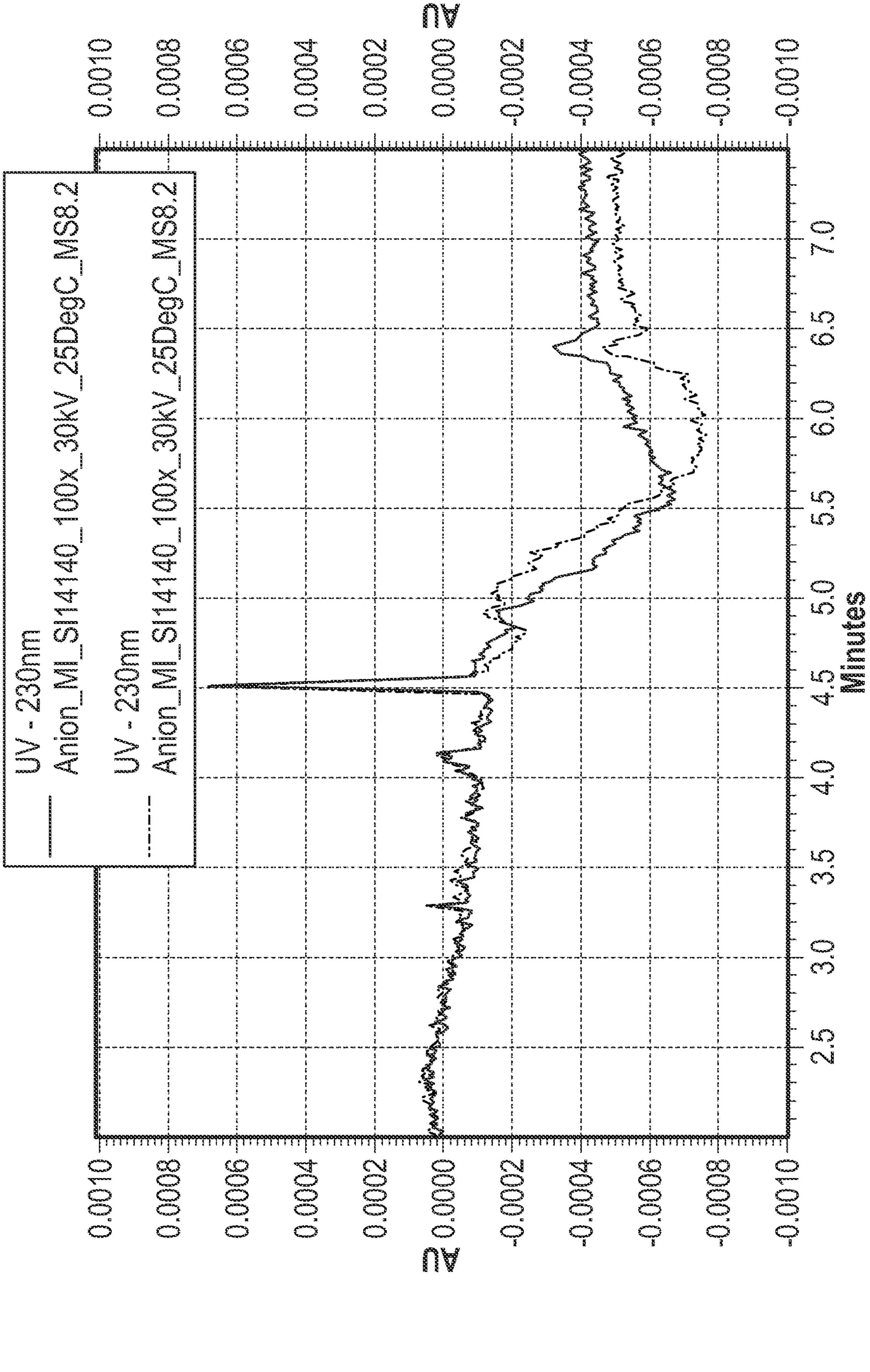

The test method 70 was tested with different types of production chemistries, as illustrated in FIGS. 6A through 6D. As illustrated, the individual production chemistries may include a range of different chemicals with different retention times and responses including a microbiocide (FIG. 6A), a hydrogen sulfide ($H_2S$) scavenger (FIG. 6B), a scale inhibitor (FIG. 6C), and a corrosion inhibitor (FIG. 6D). Depending on the interaction of the ultraviolet (UV) tracer in the CE buffer, individual components may have either negative or positive response, without affecting the quantitative response. As part of the CE buffer design, the UV tracer may also be optimized to enhance the response factors.

The data presented in FIGS. 6A through 6D was obtained with the same CE protocol, highlighting that different components on the production fluids and/or the produced/discharge water (or any other field water, either single-component or multi-component) may be detected very accurately. Furthermore, for each component, retention time is different. It is therefore possible to determine the concentration of each additive in the production fluids prepared on the rig for different types of applications.

The test method 70 generally takes less than 10 minutes (e.g., with the majority of the time relating to the separation step 78), but can be reduced even further by changing the parameters of the CE, such as voltage, flow, capillary length, buffer pH, and so forth. In addition, separation may be improved by changing the size and type of the capillary 60 and inducing a gradient of voltage during the analysis.

As described in greater detail herein, the analysis and control system 48 illustrated in FIG. 3 may collect data from various detectors 66 and/or integrators or computers 68 of CE equipment 50 (as illustrated in FIG. 4) that analyze various sample fluids that are extracted at various different points (e.g., P1, P2, P3, P4, or Pn) in a field, as illustrated in FIG. 3. In addition, the analysis and control system 48 may automatically detect and identify individual components (e.g., ions, organics, and so forth) of production chemicals 24 in the sample fluids based on CE analysis of the sample fluids in substantially real time during operation of the wellsites 10 described herein. In addition, in certain embodiments, the analysis and control system 48 may automatically adjust parameters of the production chemicals 24 in substantially real time during operation of the wellsites 10 described herein by, for example, manipulating flow rates of certain components of the production chemicals 24 that are injected into wells of the wellsites 10.

Figure 7:
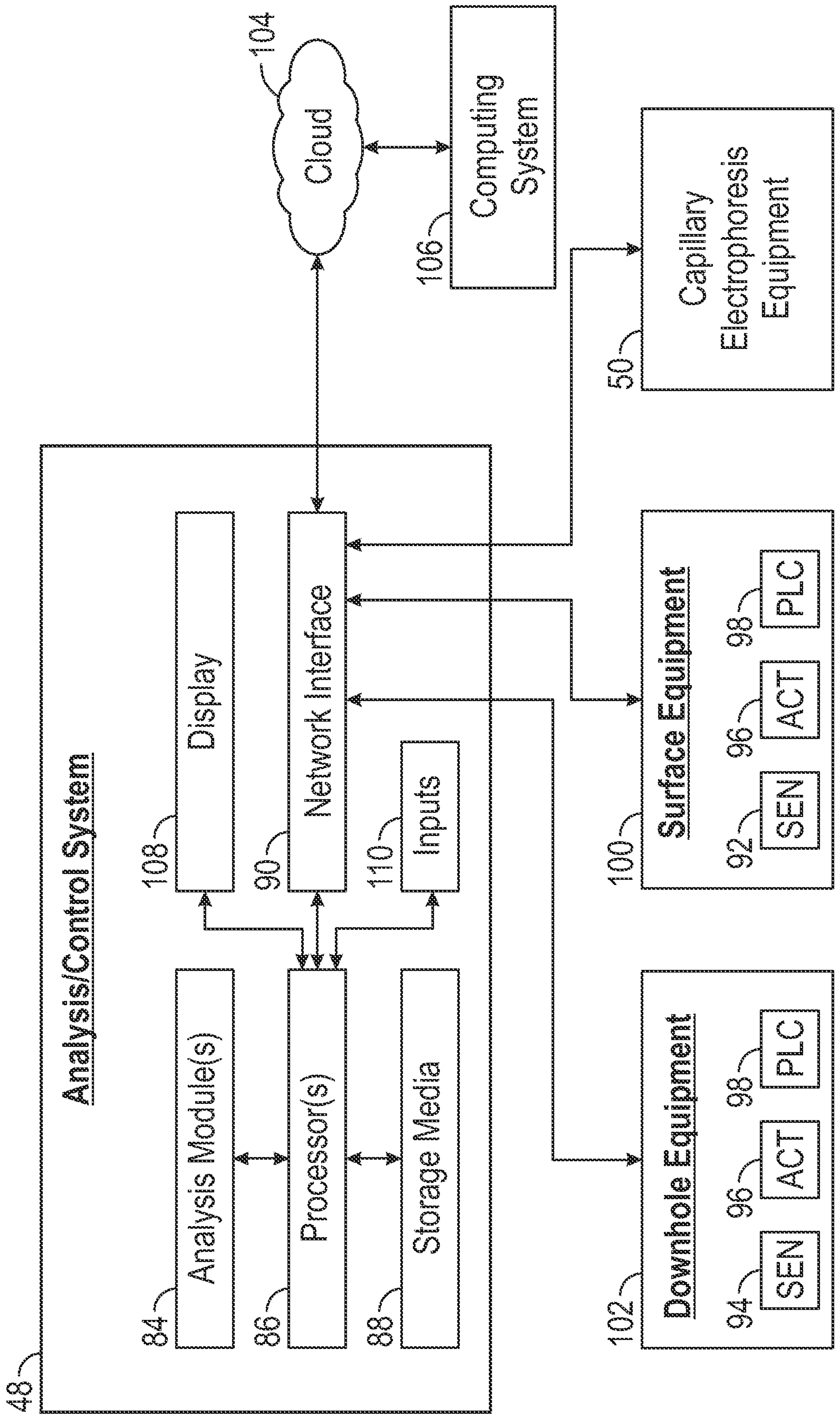
FIG. 7 illustrates an embodiment of an analysis and control system illustrated in FIG. 3, in accordance with embodiments of the present disclosure.

FIG. 7 illustrates an embodiment of the analysis and control system 48 illustrated in FIG. 3. In certain embodiments, the analysis and control system 48 may include one or more analysis modules 84 (e.g., a program of processor executable instructions and associated data) that may be configured to perform various functions of the embodiments described herein. In certain embodiments, to perform these various functions, an analysis module 84 executes on one or more processors 86 of the analysis and control system 48, which may be connected to one or more storage media 88 of the analysis and control system 48. Indeed, in certain embodiments, the one or more analysis modules 84 may be stored in the one or more storage media 88.

In certain embodiments, the one or more processors 86 may include a microprocessor, a microcontroller, a processor module or subsystem, a programmable integrated circuit, a programmable gate array, a digital signal processor (DSP), or another control or computing device. In certain embodiments, the one or more storage media 88 may be implemented as one or more non-transitory computer-readable or machine-readable storage media. In addition, in certain embodiments, the one or more storage media 88 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the processor-executable instructions and associated data of the analysis module(s) 84 may be provided on one computer-readable or machine-readable storage medium of the storage media 88, or alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the one or more storage media 88 may be located either in the machine running the machine-readable instructions, or may be located at a remote site from which machine-readable instructions may be downloaded over a network for execution. In certain embodiments, the storage media 88 may include cloud storage, which can be accessed remotely.

In certain embodiments, the processor(s) 86 may be connected to a network interface 90 of the analysis and control system 48 to allow the analysis and control system 48 to communicate with the CE equipment 50 as well as various surface sensors 92 and/or downhole sensors 94, as well as communicate with various actuators 96 and/or PLCs 98 of surface equipment 100 (e.g., surface pumps, valves, and so forth) and/or of downhole equipment 102 (e.g., electric submersible pumps, other downhole tools, and so forth) for the purpose of performing the CE analysis of sample fluids and controlling operation of the wellsites 10, as described in greater detail herein. In certain embodiments, the network interface 90 may also facilitate the analysis and control system 48 to communicate data to a cloud-based service 104 (or other wired and/or wireless communication network) to, for example, archive the CE data or to enable external computing systems 106 (e.g., cloud-based computing systems, in certain embodiments) to access the CE data and/or to remotely interact with the analysis and control system 48. For example, in certain embodiments, some or all of the analysis modules 84 described in greater detail herein may be executed via cloud and edge deployments.

In certain embodiments, the analysis and control system 48 may include a display 108 configured to display a graphical user interface to present results on the control of the operations described herein. In addition, in certain embodiments, the graphical user interface may present other information to operators of the equipment 100, 102. For example, the graphical user interface may include a dashboard configured to present visual information to operators. In certain embodiments, the dashboard may show live (e.g., real-time) data as well as the results of the control of the operations described herein.

In addition, in certain embodiments, the analysis and control system 48 may include one or more input devices 110 configured to enable operators to, for example, provide commands to the equipment 100, 102. For example, in certain embodiments, the analysis and control system 48 may provide information to the operators regarding the operations, and the operators may implement actions relating to the operations by manipulating the one or more input devices 110. In certain embodiments, the display 108 may include a touch screen interface configured to receive inputs from operators. For example, an operator may directly provide instructions to the analysis and control system 48 via the user interface, and the instructions may be output to the equipment 100, 102.

It should be appreciated that the analysis and control system 48 illustrated in FIG. 7 is only one example of a well control system, and that the analysis and control system 48 may have more or fewer components than shown, may combine additional components not depicted in the embodiment of FIG. 7, and/or the analysis and control system 48 may have a different configuration or arrangement of the components depicted in FIG. 7. In addition, the various components illustrated in FIG. 7 may be implemented in hardware, software, or a combination of both hardware and software, including one or more signal processing and/or application specific integrated circuits. Furthermore, the operations of the analysis and control system 48 as described herein may be implemented by running one or more functional modules in an information processing apparatus such as application specific chips, such as application-specific integrated circuits (ASICs), field-programmable gate arrays (FPGAs), programmable logic devices (PLDs), systems on a chip (SOCs), or other appropriate devices. These modules, combinations of these modules, and/or their combination with hardware are all included within the scope of the embodiments described herein.

Figure 8:
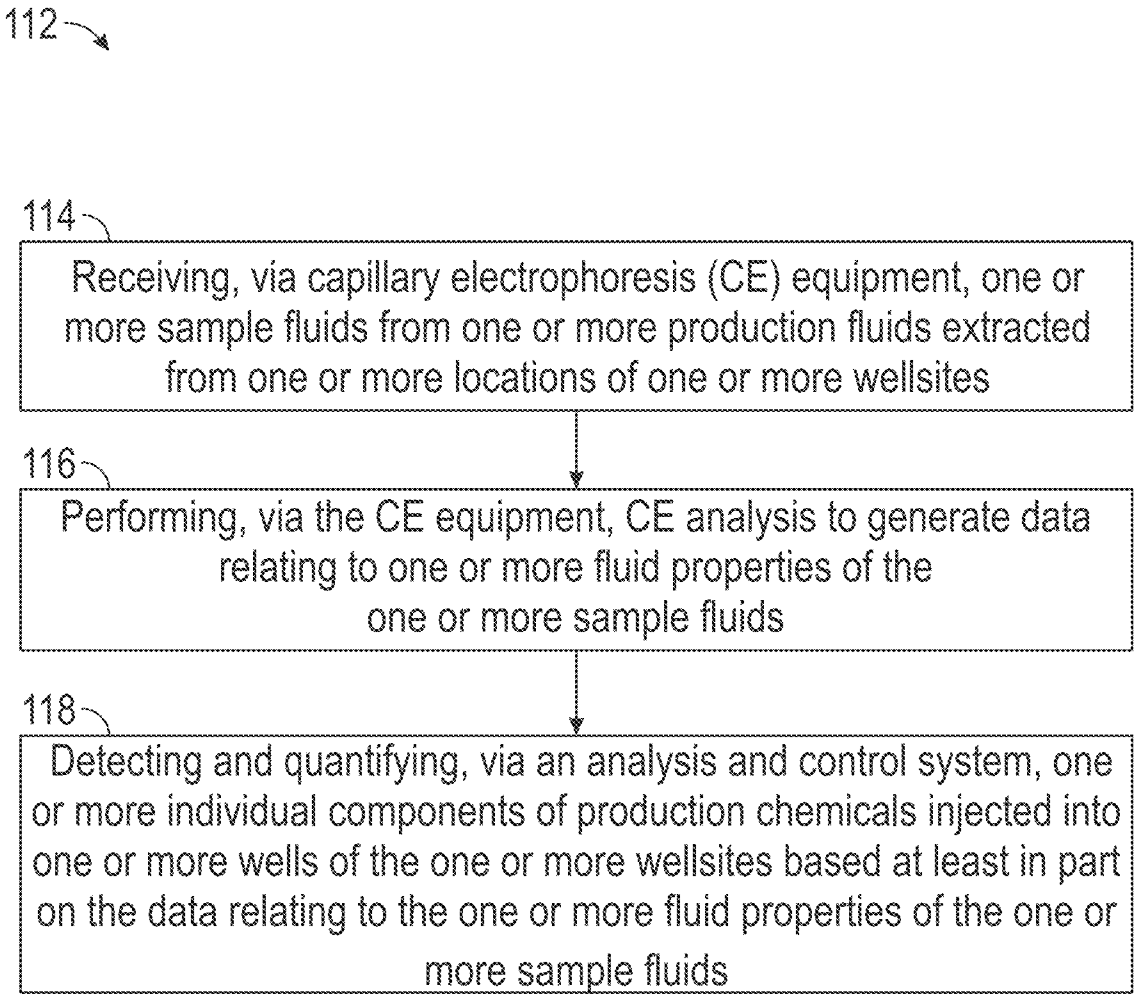
FIG. 8 illustrates a flow diagram of a method for using the analysis and control system and the CE equipment, in accordance with embodiments of the present disclosure.

FIG. 8 illustrates a flow diagram of a method 112 for using the analysis and control system 48 and the CE equipment 50 described herein. As illustrated, in certain embodiments, the method 112 may include receiving, via the CE equipment 50, one or more sample fluids from one or more production fluids extracted from one or more locations of one or more wellsites (block 114). In addition, in certain embodiments, the method 112 may include performing, via the CE equipment 50, CE analysis to generate data relating to one or more fluid properties (e.g., total dissolved solids, salinity, pH, temperature, and so forth) of the one or more sample fluids (block 116). In addition, in certain embodiments, the method 112 may include detecting and quantifying, via the analysis and control system 48, one or more individual components (e.g., ions, organics, and so forth) of production chemicals 24 injected into one or more wells of the one or more wellsites 10 based at least in part on the data relating to the one or more fluid properties of the one or more sample fluids (block 118).

In addition, in certain embodiments, the method 112 may include receiving, via the CE equipment 50, a plurality of sample fluids from a plurality of production fluids extracted from a plurality of locations of the one or more wellsites 10; and performing, via the CE equipment 50, the CE analysis to generate data relating to the one or more fluid properties of the plurality of sample fluids.

In addition, in certain embodiments, the method 112 may include extracting, via the CE equipment 50, the one or more sample fluids directly from one or more fluid flow lines of the one or more wells of the one or more wellsites 10. In certain embodiments, the one or more production fluids may include the production chemicals 24 prior to injection into the one or more wells of the one or more wellsites 10. In addition, in certain embodiments, the one or more production fluids may include produced water 30 discharged from the one or more wells of the one or more wellsites 10.

In addition, in certain embodiments, the method 112 may include automatically adjusting, via the analysis and control system 48, one or more operating parameters of the one or more wells in response to quantifying the one or more individual components of the production chemicals. For example, in certain embodiments, the analysis and control system 48 may automatically adjust flow rates of the one or more components of the production chemicals 24 prior to injection into one or more wells of one or more wellsites 10 by, for example, adjusting pump flow rates, valve settings, and so forth.

In addition, in certain embodiments, the method 112 may include detecting and quantifying, via the analysis and control system 48, the one or more individual components of the production chemicals 24 in substantially real time during operation of the one or more wells. In addition, in certain embodiments, the method 112 may include performing, via the CE equipment 50, the CE analysis to generate the data relating to the one or more fluid properties of the one or more sample fluids without adding a tracer to the one or more sample fluids.

In summary, the embodiments described herein present a methodology to analyze in-situ and in substantially real-time the composition of inhibitors while being pumped into production systems, and also at different points in the field, including the discharge locations. The techniques described herein are based on capillary electrophoresis, and do not require the addition of tracers inside the products. Based on the significance of each inhibitor on maintaining the integrity of the production systems, the techniques described herein may be utilized to determine the concentrations of all or a limited number (e.g., including only one) of the inhibitors present in the produced water 30, for example.

The CE-based techniques described herein enable compositional analysis of the products prepared for oilfield applications (i.e., to determine the concentrations of one or several selected inhibitors present in the produced water 30). The embodiments described herein can provide real-time QA/QC on the rig 12, as well as enabling automatic adjustment of concentrations of each component of the production chemicals 24 to align with a formulation designed in the laboratory.

As such, the embodiments described herein address two key questions that are relatively important for the overall review of field performance: (1) an analytical technique that helps determine ways to improve system efficiency and make decisions to reduce residual amounts of oil and added production chemicals 24 in the produced water 30; and (2) an analysis and control system 48 that helps improve the performance of other parts of the system, both upstream and downstream.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A system, comprising:

capillary electrophoresis (CE) equipment configured to receive one or more samples from one or more production fluids extracted from a plurality of locations along each well of one or more wells of one or more wellsites, and to perform CE analysis to generate data relating to one or more fluid properties of the one or more samples;

an analysis and control system configured to detect and quantify one or more individual components of production chemicals injected into the one or more wells of the one or more wellsites based at least in part on the data relating to the one or more fluid properties of the one or more samples, wherein the one or more fluid properties comprise pH, salinity, total dissolved solids, or any combination thereof; and an injection system comprising one or more pumps and one or more valves configured to inject the one or more production fluids into the one or more wells, wherein the injection system is configured to automatically adjust a flow rate for each production fluid of the one or more production fluids in the one or more wells by adjusting a pump flow rate of the one or more pumps, one or more valve settings of the one or more valves, or both, in response to quantifying the one or more individual components of the production chemicals.

2. The system of claim 1, wherein the CE equipment is configured to perform the CE analysis to generate data relating to the one or more fluid properties of the one or more samples.

3. The system of claim 1, wherein the CE equipment is configured to extract the one or more samples directly from one or more fluid flow lines of the one or more wells of the one or more wellsites.

4. The system of claim 1, wherein the one or more production fluids comprise produced water discharged from the one or more wells of the one or more wellsites.

5. The system of claim 1, wherein the analysis and control system is configured to detect and quantify the one or more individual components of the production chemicals in substantially real time during operation of the one or more wells.

6. The system of claim 1, wherein the CE equipment is configured to perform the CE analysis to generate the data relating to the one or more fluid properties of the one or more samples without adding a tracer to the one or more samples.

7. The system of claim 1, wherein the one or more production fluids comprise a microbiocide, a hydrogen sulfide ($H_2S$) scavenger, a scale inhibitor, a corrosion inhibitor, or any combination thereof.

8. The system of claim 1, wherein the analysis and control system is configured to detect and quantify the one or more individual components of production chemicals on location at the one or more wellsites.

9. A method, comprising:

receiving, via capillary electrophoresis (CE) equipment, one or more samples from one or more production fluids extracted from a plurality of locations along each well of one or more wells of one or more wellsites;

performing, via the CE equipment, CE analysis to generate data relating to one or more fluid properties of the one or more samples;

detecting and quantifying, via an analysis and control system, one or more individual components of production chemicals injected into the one or more wells of the one or more wellsites based at least in part on the data relating to the one or more fluid properties of the one or more samples, wherein the one or more fluid properties comprise pH, salinity, total dissolved solids, or any combination thereof; and automatically adjusting, via an injection system comprising one or more pumps and one or more valves, a flow rate for each production fluid of the one or more production fluids in the one or more wells by adjusting a pump flow rate of the one or more pumps, one or more valve settings of the one or more valves, or both, in response to quantifying the one or more individual components of the production chemicals.

10. The method of claim 9, comprising:

performing, via the CE equipment, the CE analysis to generate data relating to the one or more fluid properties of the one or more samples.

11. The method of claim 9, comprising extracting, via the CE equipment, the one or more samples directly from one or more fluid flow lines of the one or more wells of the one or more wellsites.

12. The method of claim 9, wherein the one or more production fluids comprise produced water discharged from the one or more wells of the one or more wellsites.

13. The method of claim 9, comprising detecting and quantifying, via the analysis and control system, the one or more individual components of the production chemicals in substantially real time during operation of the one or more wells.

14. The method of claim 9, comprising performing, via the CE equipment, the CE analysis to generate the data relating to the one or more fluid properties of the one or more samples without adding a tracer to the one or more samples.

15. An analysis and control system, comprising:

one or more processors configured to execute instructions stored on memory media of the analysis and control system, wherein the instructions, when executed by the one or more processors, cause the analysis and control system to:

detect and quantify one or more individual components and one or more fluid properties of production chemicals injected into one or more wells of one or more wellsites based at least in part on capillary electrophoresis (CE) data detected for one or more samples acquired at a plurality of locations along each well of the one or more wells of the one or more wellsites by CE equipment communicatively coupled to the analysis and control system, wherein the one or more samples are from one or more production fluids extracted from the plurality of locations along each well of the one or more wells of the one or more wellsites, wherein the one or more fluid properties comprise pH, salinity, total dissolved solids, or any combination thereof; and automatically adjust, via an injection system comprising one or more pumps and one or more valves, a flow rate for each production fluid of the one or more production fluids in the one or more wells by adjusting a pump flow rate of the one or more pumps, one or more valve settings of the one or more valves, or both, in response to quantifying the one or more individual components of the production chemicals.

16. The analysis and control system of claim 15, wherein the one or more production fluids comprise produced water discharged from the one or more wells of the one or more wellsites.

17. The analysis and control system of claim 15, wherein the instructions when executed by the one or more processors, cause the analysis and control system to detect and quantify the one or more individual components of the production chemicals in substantially real time during operation of the one or more wells.

18. The analysis and control system of claim 15, wherein the one or more samples do not include a tracer.

19. The analysis and control system of claim 15, wherein the one or more individual components comprise ions and organics.

20. The analysis and control system of claim 15, wherein the analysis and control system is configured to detect and quantify the one or more individual components of production chemicals on location at the one or more wellsites, and wherein the one or more production fluids comprise a microbiocide, a hydrogen sulfide ($H_2S$) scavenger, a scale inhibitor, and a corrosion inhibitor.

* * * * *